US007360960B2

(12) United States Patent
Hite

(10) Patent No.: US 7,360,960 B2
(45) Date of Patent: Apr. 22, 2008

(54) NOTEPAD WITH EMBEDDED WRITING INSTRUMENT

(76) Inventor: James Hite, 4516 Southern Pkwy., Louisville, KY (US) 40214

( * ) Notice: Subject to any disclaimer, the term of this patent is extended or adjusted under 35 U.S.C. 154(b) by 277 days.

(21) Appl. No.: 11/138,166

(22) Filed: May 26, 2005

(65) Prior Publication Data

US 2006/0269352 A1 Nov. 30, 2006

(51) Int. Cl.
*B43K 23/02* (2006.01)
*B42D 3/00* (2006.01)
*B32B 23/00* (2006.01)

(52) U.S. Cl. ......................... 401/131; 281/30; 428/192

(58) Field of Classification Search .................. 401/52, 401/131, 195; 281/30, 31; 462/72; 428/40.1, 428/43, 192
See application file for complete search history.

(56) References Cited

U.S. PATENT DOCUMENTS 1,848,980 A * 3/1932 Walker ...................... 281/15.1
1,904,572 A 4/1933 Trussell
2,200,146 A 5/1940 Block
2,486,840 A 11/1949 Harris
2,606,041 A 8/1952 Misiak, Jr.
2,647,517 A 8/1953 Bilbrey
2,704,077 A 3/1955 Prillaman
2,821,197 A 1/1958 Bilbrey
3,159,372 A * 12/1964 McIntosh .................... 248/683
3,350,045 A 10/1967 Mayers
4,014,285 A 3/1977 Davis
4,391,457 A 7/1983 Gassner
4,470,620 A 9/1984 Gerch
4,566,721 A 1/1986 Friedman et al.
4,907,824 A 3/1990 Smirnoff
4,932,520 A 6/1990 Ciarcia et al.
4,948,172 A 8/1990 Chang
5,011,188 A 4/1991 Zoland et al.
5,024,547 A 6/1991 Mui et al.
5,190,317 A 3/1993 Zoland
5,432,687 A 7/1995 Lane
5,480,037 A * 1/1996 Pope ........................... 211/50
5,498,089 A 3/1996 Motyka
5,560,652 A 10/1996 Zoland
5,725,250 A 3/1998 Balderrama
5,820,095 A 10/1998 Stone
5,984,560 A 11/1999 Bedol et al.
6,155,469 A 12/2000 Johnson et al.
6,382,864 B1 5/2002 Moor
6,470,536 B1 10/2002 Kettlestrings et al.
6,520,394 B2 2/2003 Ulibarri
6,543,615 B2 4/2003 Lake
7,094,454 B2 * 8/2006 Kuo et al. ................. 428/40.1

* cited by examiner

*Primary Examiner*—David J. Walczak
(74) *Attorney, Agent, or Firm*—Waters Law Group; Robert R. Waters; Brian W. Foxworthy

(57) ABSTRACT

A typical notepad has an unused section where the pages of the notepad are bound together. The present invention uses a recess in this unused section to accommodate and retain a writing utensil. This recess can be varied and clips may be used to assist in retaining the writing utensil. Also, the writing utensil itself may be shaped to more easily fit into the recess.

19 Claims, 6 Drawing Sheets

NOTEPAD WITH EMBEDDED WRITING INSTRUMENT

FIELD OF THE INVENTION

This invention relates generally to a means for holding a writing instrument in proximity to a pad of paper. More specifically, a notepad, or writing tablet, is disclosed which has a recess formed in the spine which joins the several pages of the notepad. The recess is sized and shaped to accommodate a writing implement, and the recess may be shaped and sized to frictionally retain the writing implement, or other means may be provided to retain the writing implement.

BACKGROUND OF THE INVENTION

Despite the popularity of digital communications and word processing, the traditional tools of paper and writing instruments are still very much in use. Paper notepads are still the best options for many situations, especially where portability, and versatility are factors. As proven as notepads are, they are useless without a companion writing instrument, and writing instruments are easily misplaced. Existing notepads do not lend themselves to ideal, or even just suitable, attachment of a writing instrument. The present invention allows a writing instrument to be easily packaged with, and kept with, a notepad.

Most offices have a "supply closet", or other such designated location, where office supplies are stored. The present invention would be a welcomed addition for those quick stops on the way to the meeting of the moment. Picking up a notepad constructed according to this invention results in picking up a writing instrument as well. The writing instrument is easily retrieved and stored in the same pad for future use. This enhances the utility of an already ubiquitous item.

DESCRIPTION OF PRIOR ART

U.S. Pat. No. 2,606,041 by Misiak Jr., discloses a pencil or a pen holder used in conjunction with a notebook. This pencil or pen holder consists of two layers of stiff material applied to a portion of the notebook, such as the notebook cover or back. These layers of material are approximately the length of a typical pen or pencil, slightly longer and wider than a pen or pencil. The top layer of these two layers of stiff material has a set of slits disposed therein Two slits run transverse to the length of the stiff material and are positioned one at each end, near the end. The third slit connects these two along the length of the stiff material. This creates a set of slits through this top material in the shape of a capital "I". The result is two flaps which may be bent up from this top layer of material to hold a pen or pencil between them. There is a slight recess and a pocket created by lifting up these flaps, and a pen or pencil will rest within that pocket while also being held by the flaps.

U.S. Pat. No. 5,820,095 by Stone, discloses another pen or pencil holder intended to be mounted upon another object such as a notepad or notebook. This holder has a cross-section similar to an equilateral triangle, but its interior is hollow, and one corner of this equilateral triangle is removed to allow access to that hollow interior. An alternative cross-section may be semi-circular, wherein the interior of the pen or pencil holder is hollow, and access to its hollow interior is through a gap at what would be the mid-section of the arch of the semi-circle. Either of these cross-sections extending over the length of the holder creates a slotted body into which a pen or pencil may be pushed into the interior through the slot. As an alternative embodiment, grooves may be cut along each side of the interior of the pen or pencil holder to allow the resulting flaps to more easily hinge away from the center of the hollow interior. Provision in this patent is also made for a means for mounting the pen or pencil holder to a notebook or notepad. This comprises a clip section formed along the back of the pen or pencil holder. This clip section is made essentially integral to the rest of the pen or pencil holder.

U.S. Pat. No. 2,486,840 by Harris is for a pencil carrying memorandum pad or book. An initial embodiment of the memorandum pad consists of sheets of paper stacked in two layers. The upper layer is further divided into two narrow stacks separated by a slot. Within this slot, a pen or pencil may be accommodated. The lower layer consists of sheets which are as wide as the outer edges of the narrow stacks of paper forming the upper layer. The pen or pencil would rest upon this lower layer. Another embodiment comprises a single layer of paper with a cutout for a pen or pencil. This cutout is open to the bottom edge of the sheets of paper and leaves the stack looking somewhat like a horseshoe. A further embodiment has the paper formed into two narrow stacks. These narrow stacks form the entirety of the pad and there is no lower layer of full width paper. These narrow stacks are again separated by a slot where a pencil may fit. It is envisioned in one embodiment that the pencil or pen may clip to the cover of the pad so that when the cover is folded down over the pad, the pen or pencil rests in the slot created by the separated stacks of narrow paper.

U.S. Pat. No. 2,200,146 by Block discloses a notebook having a cut out within its pages to accommodate a pen or other writing utensil. This notebook comprises sheets joined at their edge by a common ring or wire formation and a cover. When closed, the notebook is covered front and back by the covers and the wire formation acts as a hinge. When opened, the notebook can lay somewhat flat and central, and the common edge of the paper has a cutout within it so that a writing utensil may be accommodated in the middle of the opened notebook. Provision may also be made for the wire formation which holds the sheet and covers together as a notebook to also assist in holding the writing utensil.

SUMMARY OF THE INVENTION

The present invention relates to packaging, storing, and keeping a writing instrument with a writing tablet or notepad. A most common and economical structure for a writing tablet is a stack of sheets pressed together along one edge to form a spine. The sheets are independent of each other except for where they form the spine. Usually a cardboard backing is attached along the back of the spine, and each sheet is perforated where it enters the spine to allow a sheet to be torn from the pad. The present invention uses a recess or pocket cut into the spine to accommodate and retain a writing instrument.

In the preferred embodiment, the pocket or recess in the spine runs lengthwise along the spine and is shaped and sized to receive the entire writing instrument. The depth of the pocket is such that the writing instrument is flush with the surface of the spine or new notepad or even slightly recessed into the spine. This provides a great advantage in stacking for packaging and storing. Not only is the notepad complimented with the presence of a writing instrument, it is enhanced, no longer needing a clipboard or other device typically used to keep a writing instrument and pad together. It also enables the writing instrument to be kept with the notepad without snagging on or conflicting with other items being carried, etc. The recess or pocket may have a wide range of sizes and shapes depending on its intended use. It may be closely sized to the writing instrument to provide sufficient friction to retain the writing instrument, or it may be oversized to accept and accommodate an individual's preferred writing instrument. In smaller notepads, the recess or pocket may run the entire length of the side of the pad where it is located in order to accommodate a regular sized writing instrument. In thicker notepads, the recess or pocket would be in the shape of a hole wherein the opening to the recess is sized to accommodate the diameter of the writing instrument and the depth of the recess is sized to accommodate the length of the writing instrument. This type of recess would enter the notepad on an edge or side. Additional methods and devices may be used to retain the writing instrument, such as clips, bands, and clasps.

In addition to variations of the size, shape and location of the recess, the sheets of the notepad may vary as well. The sheets may have preprinted forms on them. An example of this would be where the sheets have months of the year preprinted on them so that the notepad may be used as a calendar. Other examples include questionnaires, task lists, etc.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Accordingly those skilled in the art will appreciate that the conception upon which this invention is based may readily be utilized as a basis for the design of other structures, methods and systems for carrying out the several purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patents or legal terms or phraseology, to determine quickly from a cursory inspection, the nature and essence of the technical disclosure of the application. The Abstract is neither intended to define the invention of the application, nor is it intended to be limiting to the scope of the invention in any way.

BRIEF DESCRIPTION OF THE DRAWINGS

Additional utility and features of the invention will become more fully apparent to those skilled in the art by reference to the following drawings, which illustrate the primary features of the preferred embodiment.

DETAILED DESCRIPTION OF THE PREFERRED EMBODIMENT

The detailed description below is for preferred embodiments and is intended to explain the current invention. It is to be understood that a variety of other arrangements are also possible without departing from the spirit and scope of the invention. Where appropriate, the same numbering will be used when discussing different embodiments.

Figure 1:
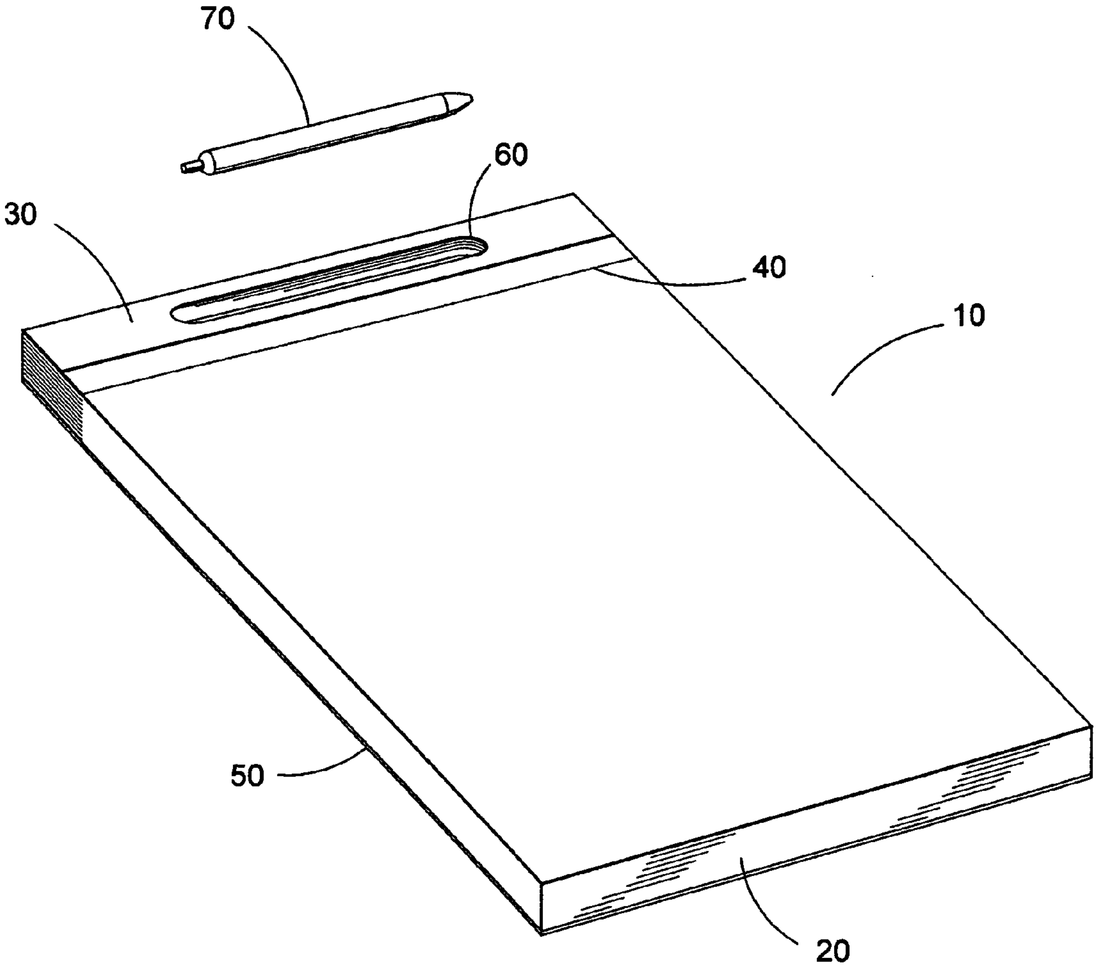
FIG. 1 shows an embodiment of the present invention.

FIG. 1 shows an embodiment of the notepad 10 of the present invention. This notepad 10 is similar to typical notepads in that it is comprised of a stack of sheets 20 which are bound along one edge. This bound edge will have a shorter dimension defined by the thickness of the notepad and a longer dimension defined by either the width or length of the notepad surface. The area where the sheets are bound together creates an unused section 30 similar to the spine of a book. Frequently, at the edge of this unused area 30 where the sheets 20 transition from the bound portion to the useable portion, lines of perforations 40 are disposed to enable these sheets to be torn off and removed from stack 20. Usually notepads are also backed by a cardboard backing 50. The present invention of a novel notepad 10 has a recess 60 in the unused section 30 of the notepad 10. Recess 60 has a longer dimension correlatine roughly to the length of writing utensil 70 and at least one shorter dimension to generate a volume to receive writing utensil 70. If recess 60 is rounded in cross section then only a single shorter dimension is necessary in the form of a radius. If recess 60 is polygonal in cross section then more than one shorter dimension will be necessary in the form of a depth and width for recess 60. In the embodiment of FIG. 1. the longer dimension of recess 60 is aligned substantially parallel with the longer dimension of the bound edge of stack of sheets 20.

This recess 60 is shaped to accept a writing utensil 70. The recess 60 may be sized so as to hold writing utensil 70 with friction, or alternatively, other means may be used. The writing utensil 70 thus stored may be kept with the notepad 10 without conflicting with other notepads in a stack of notepads or conflicting with other items being carried, etc.

Figure 2:
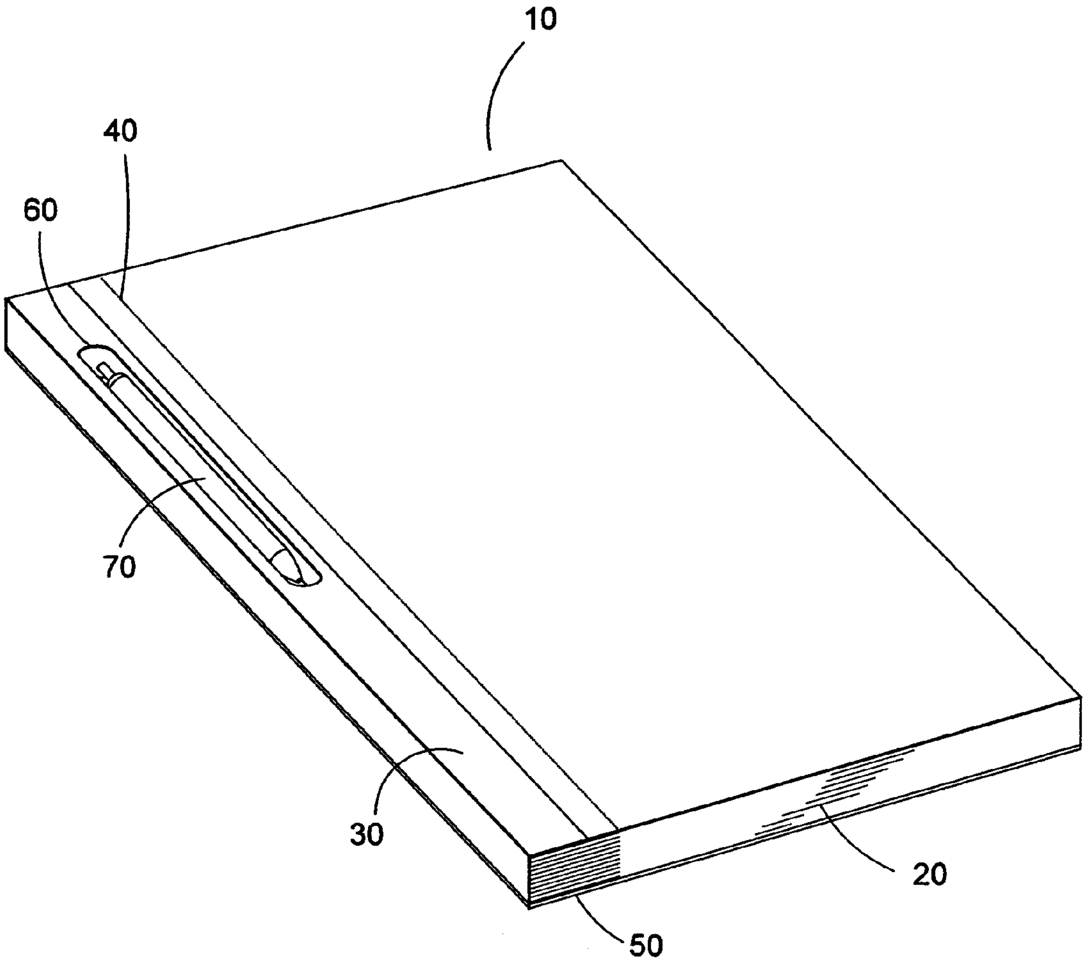
FIG. 2 shows an alternative embodiment of the present invention.

While FIG. 1 shows the unused section 30 of the notepad 10 being along the top edge of the notepaper, FIG. 2 shows an embodiment where the paper is bound along the side edge. This arrangement is particularly useful wherein notepad 10 is of a smaller size and writing utensil 70 and recess 60 would be too long for the short edge of notepad 10. However, this arrangement could be used where notepad 10 is comprised of full sized writing sheets. In this embodiment the longer dimension of the bound edge is defined by the side of notepad 20. The shorter dimension of the bound edge is still defined by the thickness of notepad 20. This embodiment still has the longer dimension of recess 60 aligned substantially parallel with the longer dimension of the bound edge.

Figure 3:
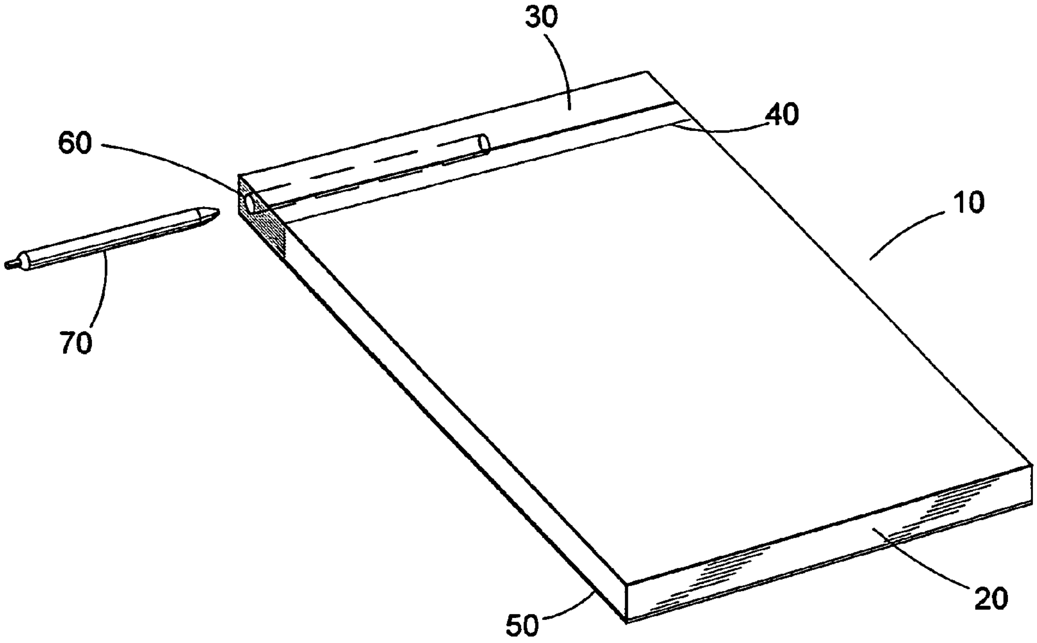
FIG. 3 shows an embodiment where the writing utensil is inserted lengthwise.

FIG. 3 illustrates yet another embodiment wherein the recess 60, rather than being cut into the upper surface of notepad 10, is directed from an edge of notepad 10. The longer dimension of recess 60 would still have to coincide with the longer dimension of the unused section 30. The depth of recess 60 should also allow most of writing instrument 70 to be inserted into recess 60.

Figure 4:
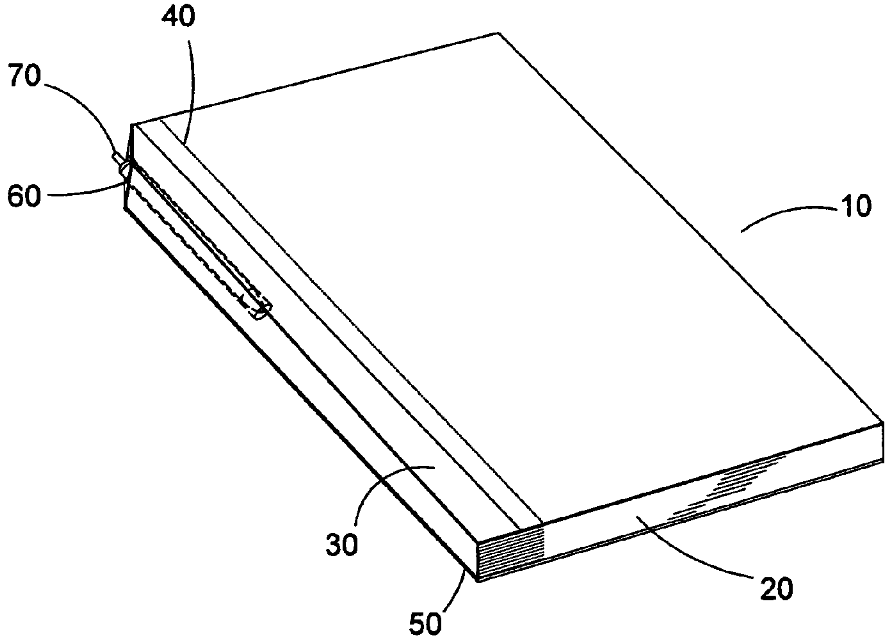
FIG. 4 shows an alternative embodiment where the writing utensil is inserted lengthwise.

FIG. 4 shows an embodiment where the stack of sheets 20 is bound along a long edge and the recess 60 is directed into an edge of said notepad 10. Additionally, FIG. 4 shows a corner of the notepad 10 trimmed away where the writing utensil 70 is inserted into the recess 60. This gives somewhat greater access to the writing utensil 70 while it is inserted into the recess 60.

Figure 5:
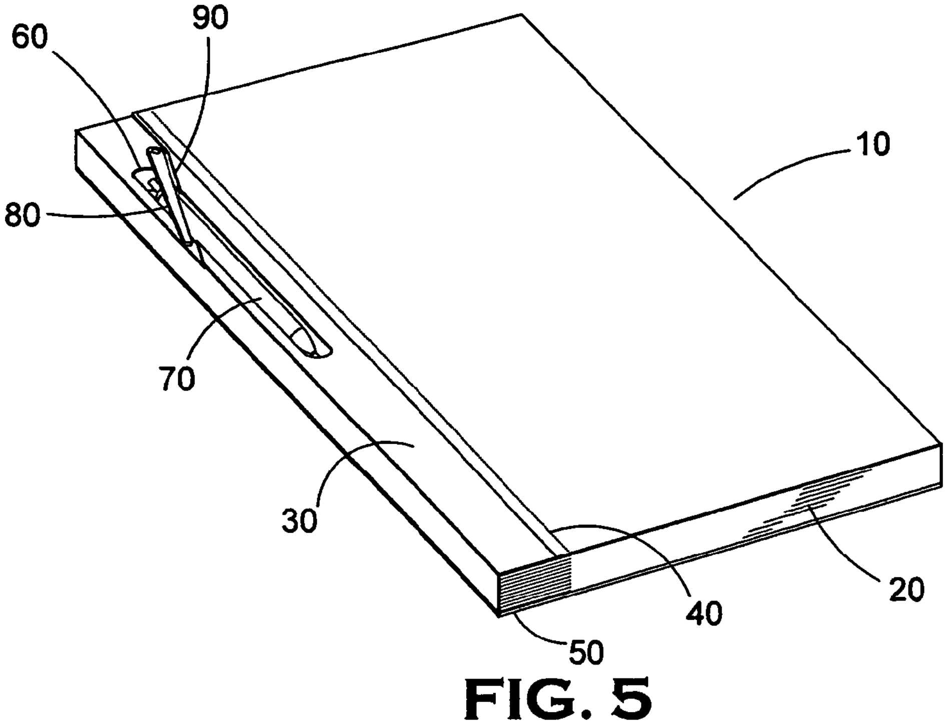
FIG. 5 shows a clip on the surface of the notepad to assist in retaining the writing utensil.

FIG. 5 illustrates an embodiment wherein a clip 80 is added to assist in retaining the writing utensil 70. The clip 80 is pivotally fixed to the upper surface of the notepad 10 in the unused section 30. The clip 80 may be pivoted over the recess 60 to assist in retaining the pen and pivoted away from the recess 60 to allow easy removal of the writing utensil 70. In the particular embodiment shown, a small step 90 has been cut in the surface of the unused section 30 so that the clip 80 is itself flush with the surface of the unused section 30.

Figure 6:
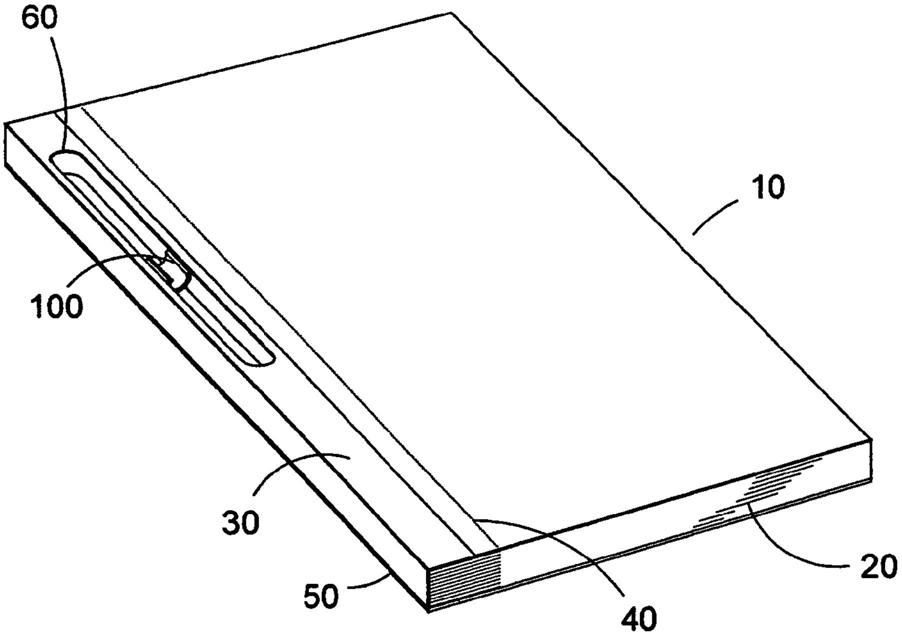
FIG. 6 shows a clip located within the recess of the notepad to assist in retaining the writing utensil.

FIG. 6 also shows an embodiment where a clip 100 is used to retain the writing utensil 70. However, in this case, the clip 100 is inserted into the recess 60 and is fixed there. The clip 100 may be of a type that partially encircles a writing utensil 70 which is inserted or pushed into the clip 100. The clip 100 is fixed in position and thus holds the writing utensil 70 within the recess 60. The recess 60 may be partially cut out in the region where the clip 100 is located such that overall the recess 60 closely fits the writing utensil 70 or the recess 60 may be cut oversized to the writing utensil 70 and the clip 100 merely fits within the recess 60 and the recess 60 is oversized to the writing utensil 70.

Figure 7:
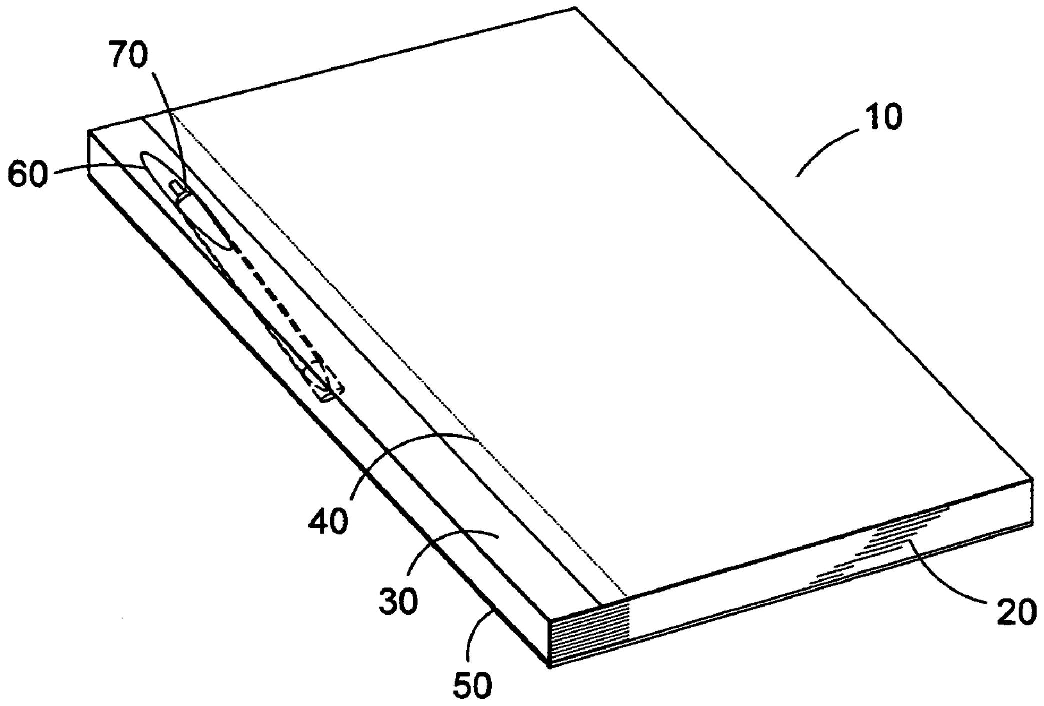
FIG. 7 shows a recess inclined into the unused section of the notepad.

In FIG. 7, recess 60 is cut at an angle into the unused section 30 of the notepad 10, but the longer dimension of recess 60 is still aligned substantially parallel with the longer dimension of the bound edge. When a writing utensil 70 is inserted into the recess 60, it will be partially concealed and partially exposed. It is possible that writing utensil 60 protrudes slightly from the surface of notepad 10, with this embodiment.

Figure 8:
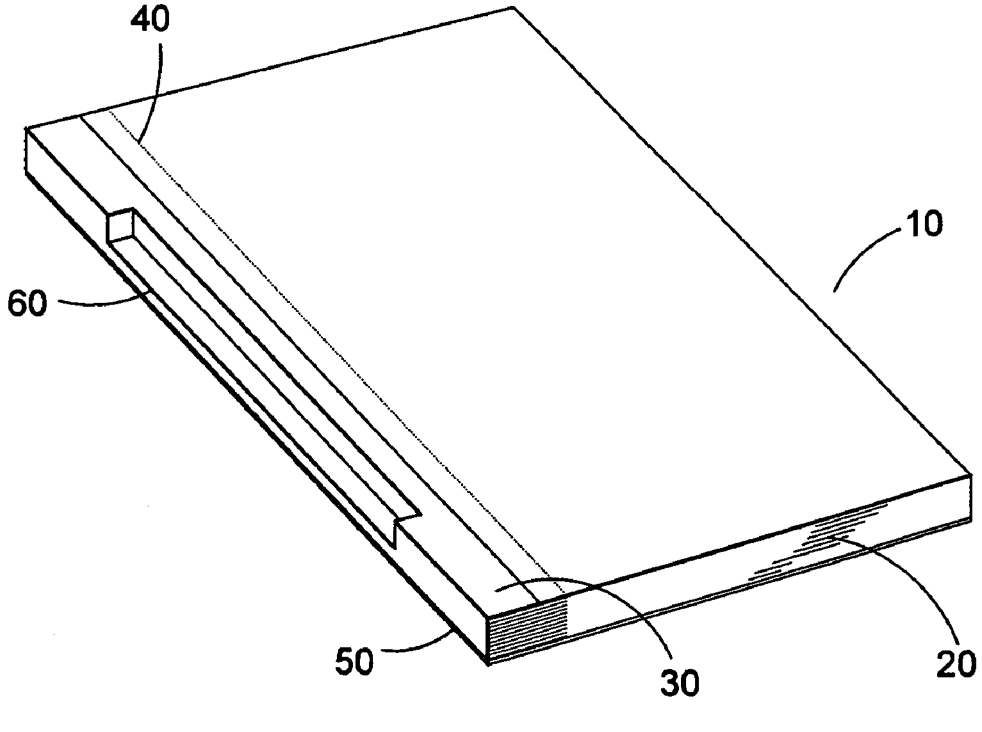
FIG. 8 shows a recess created by the removal of the corner edge of the unused portion.

FIG. 8 shows an embodiment of notepad 10 where recess 60 is cut along a corner edge of unused section 30. This results in recess 60 having two open sides which are contiguous. The interior of recess 60 may have various contours depending on the type of writing utensil to be retained and the desired method of retaining a writing utensil, as well as other factors. However, the longer dimension of recess 60 still needs to align substantially parallel with the longer dimension of the bound edge.

Figure 9:
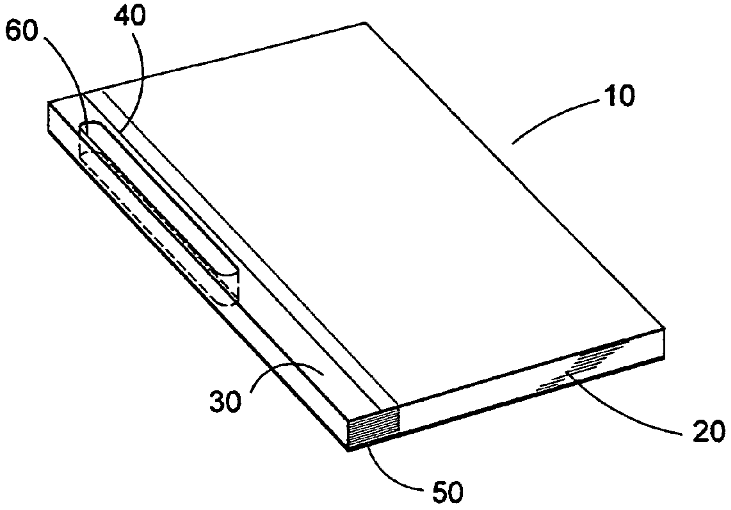
FIG. 9 shows a recess that passes all the way through the unused portion from top to bottom.

FIG. 9 shows a notepad 10 wherein recess 60 passes through unused section 30. In this case, recess 60 passes through unused section 30 from the top surface to the bottom surface to created two open sides of recess 60 which are opposed. This embodiment may be preferred for some manufacturing techniques.

Figure 11:
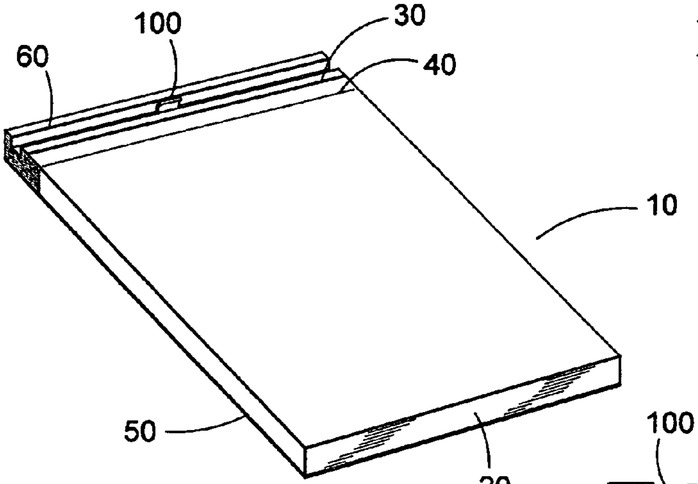
FIG. 11 shows a recess that passes all the way through the unused portion from edge to edge.
Figure 12:
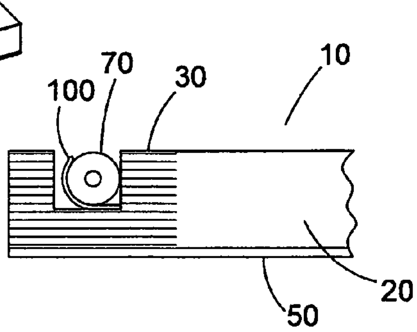
FIG. 12 shows a clip located in the recess.

In an embodiment similar to that shown in FIG. 9, FIG. 11 shows an embodiment where recess 60 runs from side to side of notepad 10 while being opened at the top surface. This produces a recess 60 opened on three sides. FIG. 11 also shows a clip 100 located in recess 60. Clip 100 is further illustrated in FIG. 12 which is an end view of recess 60 shown in FIG. 11. FIG. 12 shows a writing utensil 70 held by clip 100.

Figure 10:
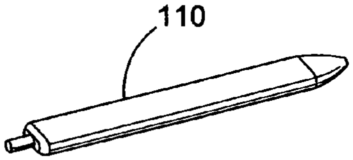
FIG. 10 shows a writing utensil specifically shaped to fit a lower profile notepad.

FIG. 10 shows a writing utensil 110 is which specifically shaped to fit within the profile a notepad. It bears noting that the present invention my comprise only a notepad having a recess formed to accept a users preferred writing utensil, or the invention may comprise a notepad with a recess and a writing utensil in the recess as a package. FIG. 2, FIG. 4, and FIG. 5 show a writing utensil 70 located in recess 60. FIG. 12 provides an end view with writing utensil 70 in place.

The embodiments discussed above illustrate variations in the size, shape, and location of the recess as well as variations in the notepad and items supplementing the recess, and in each embodiment the longer dimension of recess 30 aligns substantially parallel with the longer dimension of the bound edge of notepad 10. However, the sheets of the notepad themselves may be varied. This can be done by preprinting forms or other patterns on the sheets. A particular embodiment would be sheets with months of the year printed on them so that the notepad would function as a calendar. In this case, or any other, the sheets may or may not have perforated lines in them. Other preprinted forms could be placed on the sheets such as questionnaires and task lists.

Having provided detailed descriptions of the preferred embodiments, it should be noted that there are several means to vary the specific sizing and arrangement but still accomplish the construction of the invention. It should be obvious from this that there are numerous embodiments subsumed in the present invention, and the scope of this invention should not be limited by the discussion of the preferred embodiments above. Neither the specification, nor the abstract, should be taken as an exhaustive illustration of the invention, but rather, the invention is defined by the following claims.

I claim:

1. A notepad and writing utensil combination, comprising;

a notepad having a stack of sheets bound to each other along a bound side, said bound side having a longer dimension and a shorter dimension, wherein said notepad has a recess cut into an unused section of said sheets along said bound side, said recess having a longer dimension and at least one shorter dimension, said longer dimension of said recess being aligned substantially parallel with said longer dimension of said bound side; and wherein, said writing utensil may lie in said recess.

2. The notepad of claim 1, wherein; said recess has one open side.

3. The notepad of claim 2, wherein; said open side is on the top surface of said notepad and is at least as long as said writing utensil.

4. The notepad of claim 2, wherein; said open side is on the edge of said notepad and said open side is at least as wide as said writing utensil and said recess is directed along the length of said unused section.

5. The notepad of claim 4, wherein; the corner of said notepad near where said recess is located is trimmed so that a writing utensil inserted into said recess is partially exposed.

6. The notepad of claim 1, wherein; said recess is sized to retain said writing utensil with friction.

7. The notepad of claim 1, wherein; said recess passes through said notepad, either top to bottom, or from side to side.

8. The notepad of claim 1, wherein; said recess is located along a corner edge of said notepad.

9. The notepad of claim 1, further comprising; a clip to assist in retaining said writing utensil.

10. The notepad of claim 9, wherein; said clip is positioned, or positionable over said recess.

11. The notepad of claim 10, wherein; said clip is pivotally fixed to said unused section of said notepad, and is capable of being pivoted over said recess and away from said recess.

12. The notepad of claim 9, wherein; said clip is positioned within said recess.

13. The notepad of claim 12, wherein; said clip is configured to partially encircle said writing utensil.

14. The notepad of claim 1, wherein; said recess is angled into said unused section and said writing utensil is partially exposed and partially hidden.

15. The notepad of claim 1, wherein; said writing utensil is specifically shaped to fit within said recess.

16. The notepad of claim 1, further comprising; a cardboard backing.

17. The notepad of claim 1, wherein; said sheets have preprinted forms on them.

18. The notepad of claim 1, wherein; said sheets have calendar months preprinted on them.

19. A notepad and writing utensil combination, comprising;

a notepad having a single stack of sheets bound to each other along a bound side, said bound side having a longer dimension and a shorter dimension, said notepad having an unused section along said bound side, wherein said notepad has a recess cut into said unused section of said notepad, said recess having a longer dimension and at least one shorter dimension, said longer dimension of said recess being aligned substantially parallel with said longer dimension of said bound side, and;

said recess being wholly contained within said unused section; and wherein, said writing utensil lies in said recess.

* * * * *